United States Patent [19]
Kühn

[11] Patent Number: 5,715,157
[45] Date of Patent: Feb. 3, 1998

[54] APPARATUS FOR BRAKING A SPINDLE MOTOR IN A DISC PLAYBACK SYSTEM

[75] Inventor: Hans Robert Kühn, St. Georgen, Germany

[73] Assignee: Deutsche Thomson-Brandt GmbH, Villingen-Schwenningen, Germany

[21] Appl. No.: 785,347

[22] Filed: Nov. 1, 1991

[30] Foreign Application Priority Data

May 3, 1989 [DE] Germany ............... 39 14 587.5
Apr. 23, 1990 [WO] WIPO ............... PCT/EP90/00649

[51] Int. Cl.$^6$ ............... G11B 5/09; G11B 15/48
[52] U.S. Cl. ............... 369/50; 369/53; 360/74.1
[58] Field of Search ............... 369/50, 54, 58, 369/47, 53, 55, 56, 57; 360/73.3, 74.1, 74.4, 73.03; 318/362, 375

[56] References Cited

U.S. PATENT DOCUMENTS

| | | | |
|---|---|---|---|
| 4,439,849 | 3/1984 | Nabeshima | 369/50 |
| 4,460,857 | 7/1984 | Michaelis | 318/375 |
| 4,672,595 | 6/1987 | Senso | 369/50 |
| 4,675,855 | 6/1987 | Iso et al. | 369/50 |
| 4,727,530 | 2/1988 | Tomisawa | 369/59 |
| 4,751,693 | 6/1988 | Yoshimaru | 369/32 |
| 4,831,469 | 5/1989 | Hanson et al. | 360/75 |
| 4,979,048 | 12/1990 | Shimada et al. | 369/44.26 |
| 5,056,076 | 10/1991 | Tsuji et al. | 369/50 |

FOREIGN PATENT DOCUMENTS

| | | |
|---|---|---|
| 2470506 | 5/1981 | France. |
| 02130760 | 5/1990 | Japan. |

*Primary Examiner*—P. W. Huber
*Attorney, Agent, or Firm*—Joseph S. Tripoli; Eric P. Herrmann

[57] ABSTRACT

A disc playback system monitors coded information in the tracks of discs being played back in order to determine the radial position of the information pickup apparatus. Responsive to a disc stop command, the radial position is utilized to determine the angular speed of the disc, and thereby the speed of the motor that is rotating the disc. A time period, necessary for a predetermined signal which accelerates the motor in the reverse direction to stop the rotation of the disc, is calculated in response to the angular speed at the time the stop command is instituted. Thereafter the predetermined reversing signal is applied to the motor for the calculated period to stop the rotation of the disc.

2 Claims, 4 Drawing Sheets

APPARATUS FOR BRAKING A SPINDLE MOTOR IN A DISC PLAYBACK SYSTEM

This is a continuation of PCT application PCT/EP 90/00649 filed Apr. 23, 1990 by Hans Robert Kuhn and titled "RECORDING AND/OR PLAYBACK DEVICE FOR CONTACTLESSLY SCANNABLE ROTATING RECORDING SUBSTRATES."

This invention is directed to recording/playback devices for rotating recording media which are scanned without contact being made.

BACKGROUND OF THE INVENTION

Recording/playback devices, such as compact disc players and video disc players, are equipped with a loading and unloading mechanism with which the recording medium can be manually loaded and unloaded. After being loaded the compact disc is automatically transferred to a playback position. Also, by pressing a stop button, the user can interrupt the playback at any time. The compact disc is stopped and automatically transferred from the playback position to the removal position and is available for manual unloading.

In "Funkschau" 10, May 1985, on pages 50 through 54 a test report concerning two compact disc players of the so-called "drawer" type is described. With this type of player, the loading and unloading mechanism is a drawer which moves in and out of the front of the CD player. The CD players evaluated in this test report are also equipped with a STOP button. However, in order to avoid damaging the disc's sensitive surface during the unloading, before the compact disc is transferred from the playback position to the removal position, the disc must be slowed down, and preferably stopped. The rotational speed of a compact, or video disc player is not constant because such players are constant linear velocity (CLV) players. Such players maintain the linear velocity of the pickup device constant as the distance of the pickup device from the center of disc changes. Accordingly, it is possible for the disc to still be turning, either in the playback direction or backwards if braking is too severe when the disc arrives at the unload position. The sensitive surface of a compact disc which is still turning during the position change from the playing position to the unload position can be damaged. Therefore, in order to ensure that the disc is stationary a short waiting period is sometimes used between the braking and the unloading of the disc to provide a protective time interval to allow the disc to lose speed and come to a halt. This measure has the disadvantage of delaying the unloading of the disc.

From FR-A-2470506, it is known to apply a braking signal with a fixed value to the disc drive motor in order to bring the rotating disc to a halt. A measuring device measures the rotating speed of the disc during braking and when the disc is slowed to a predetermined rotating speed, typically zero, braking is terminated.

SUMMARY OF THE INVENTION

The invention provides a recording playback device for a rotating recording medium which quickly and reliably brings the recording medium to a stop for unloading. With the invention, the braking force used to stop the rotating recording medium is provided in accordance with the diameter of the recording medium and the rotational speed of the medium when the stop signal is received.

DETAILED DESCRIPTION

The braking of the rotating disc can be carried out using one, or more, braking pulses which are applied to the disc drive motor. The duration and/or amplitude of the braking pulses depends on the rotational speed of the disc. The speed can be measured using a transparation mark on the disc and a photosensor. The rotational speed of the disc can also be measured using a subcode which provides information about a factor called accumulated playback time. The accumulated playback time, also frequently called A-time, is indicative of a particular speed of the rotating disc.

The rotating speed "n" is calculated in accordance with the following equation:

$$n = w1 - (w1 - w2)A/T,$$

where

W1 is the initial rotational speed

W2 is the final rotational speed,

T is the total playing time of the disc,

A is the accumulated playback time.

With a compact disc (CD), the rotational speed when reading the innermost data track is 500 r.p.m., and decreases linearly to 215 r.p.m. when reading the innermost data track. With a CDV disc, which contains both audio and video, the rotational speed for video is 2700 r.p.m. on the outermost track and 2000 r.p.m. when reading the outermost data track With a CDV disc, therefore, the rotational speed can lie between either 500 r.p.m. and 200 r.p.m., or between 2700 r.p.m. and 2000 r.p.m. according to whether audio or video is played back. Irrespective of the playback speed, a CDV disc should always be brought to a complete halt for removal.

Figure 1:
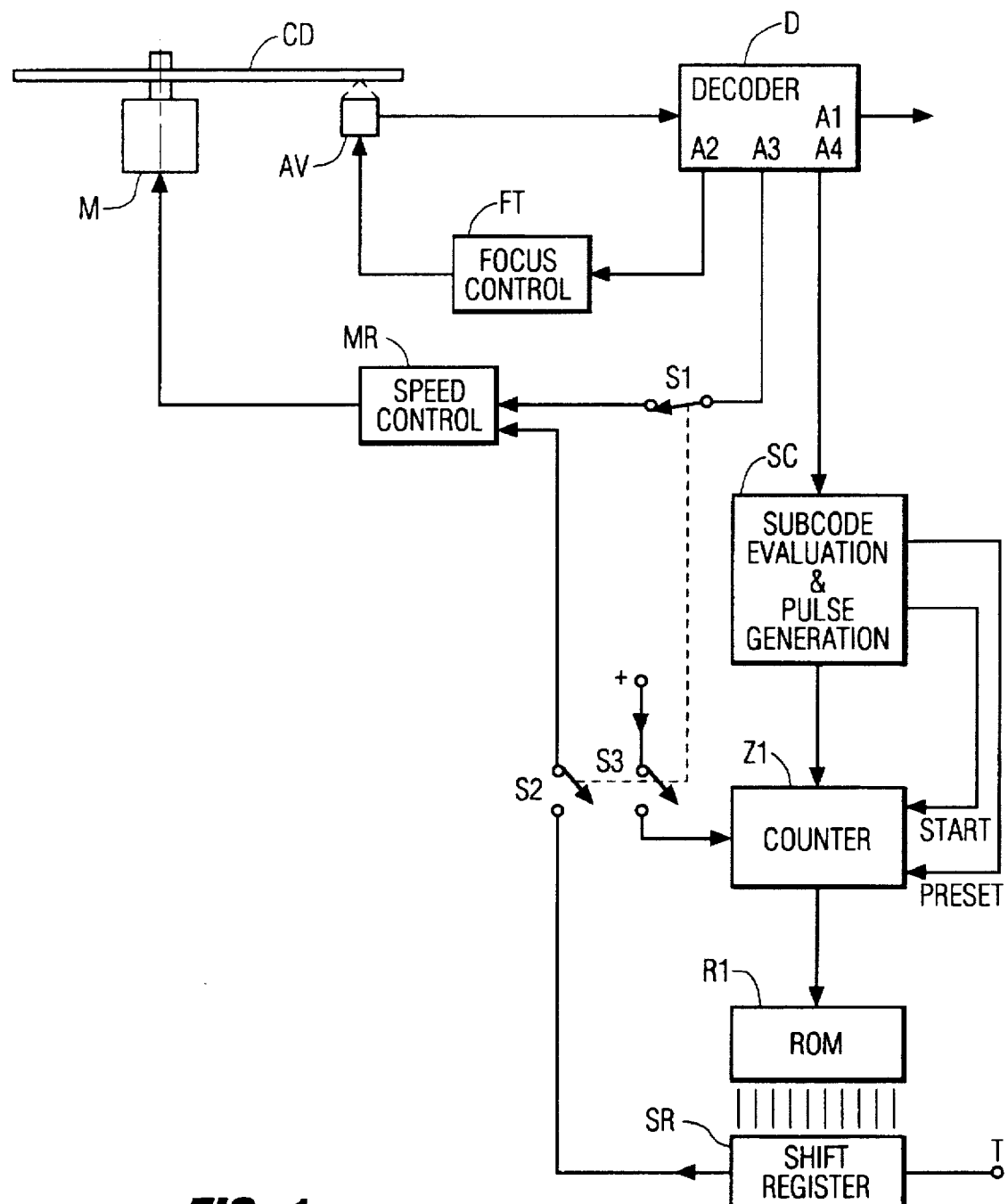
FIG. 1 is a preferred embodiment of a system for generating braking pulses in accordance with the rotational speed of the recording medium.

FIG. 1 shows an arrangement in which the braking pulses for a disc drive motor are generated in accordance with the actual instantaneous rotational speed of the disc. Rotational speed data are read from a compact disc CD using an optical scanning device AV. The disc is driven by a motor M, and the speed data are fed to a decoder D. The decoder D provides an audio signal at its first output terminal A1. The decoder D provides regulating signals for a regulator FT of a focusing and tracking regulation loop at its second output A2. The decoder D provides the regulating signal for the disc rotating speed at the third output terminal A3. The speed regulating signal is coupled via a switch S1 to a rotational speed regulator MR. The subcode is provided at the fourth output A4 of the decoder D. The subcode is coupled to an evaluation circuit SC, the output of which is coupled with the input of a counter Z1.

The evaluation circuit SC supplies counting pulses to the counter Z1, the pulses correspond to the accumulated playback time (A). When the disc is played back from the innermost track of the disc, the evaluation circuit SC sets the count of the counter Z1 to zero and counting pulses are a measure of the accumulated playback time and thus, also a measure of the respective actual disc rotating speed.

When the compact disc is not played back from the beginning, but rather from a different musical item, the seventh for example, the evaluation circuit SC recognizes the accumulated playback time by way of the subcode. The subcode represents the time at which the seventh musical item starts, calculated according to playback from the beginning. The evaluation circuit SC sets the counter Z1 to the count which corresponds to the accumulated playback time for the seventh musical item. The evaluation circuit SC updates the count every time a change is made from one piece of music to another. The count is, therefore, always proportional to the rotating speed of the compact disc.

The output terminals of counter Z1 are coupled with the input terminals of a ROM R1, the output terminals of which are coupled with a shift register SR. The output terminal of the shift register SR is coupled, via a switch S2, to the rotating speed regulator MR of the motor M. The stop input terminal of the counter Z1 can be coupled, via a switch 33, to the positive terminal of a voltage source.

While the compact disc is being played back, the switch S1 remains closed and switches S2 and S3 are open. When the user wishes to remove the disc from the disc player, the STOP button is pushed and the switches S2 and S3 are closed and switch S1 is opened. The closing of switch S3 stops the counter Z1. The count serves as an address for the ROM R1 in which various bit patterns are stored. Using the shift register SR, the bit pattern belonging to the count is sent as a single braking pulse, or a sequence of several braking pulses, to the rotating speed regulator MR of the motor M in order to bring the compact disc to a quick and reliable halt with the correct braking force. The bit patterns stored in the ROM R1, which determine the length and number of the braking pulses, can, for example, be determined emprically.

Figure 2:
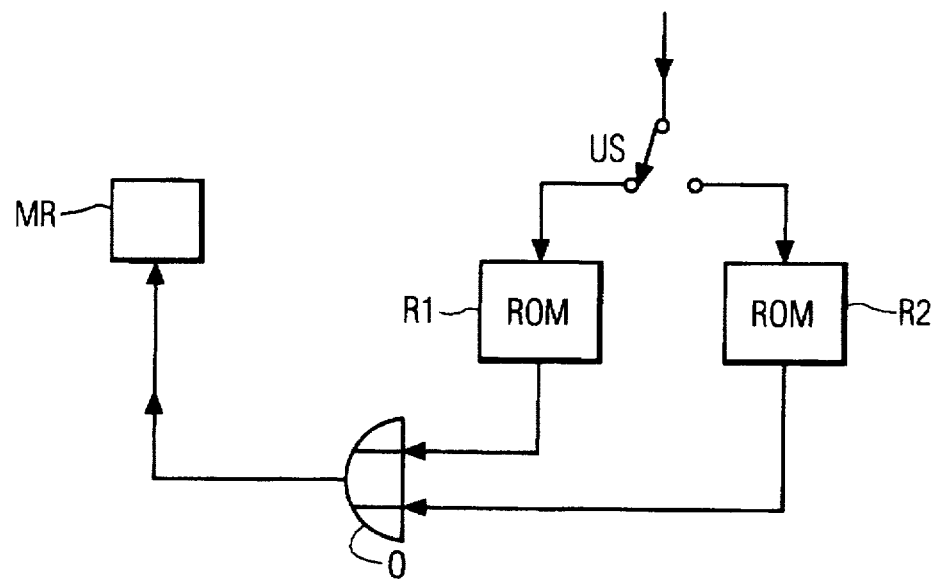
FIG. 2 shows a modification to the embodiment of FIG. 1.
Figure 3:
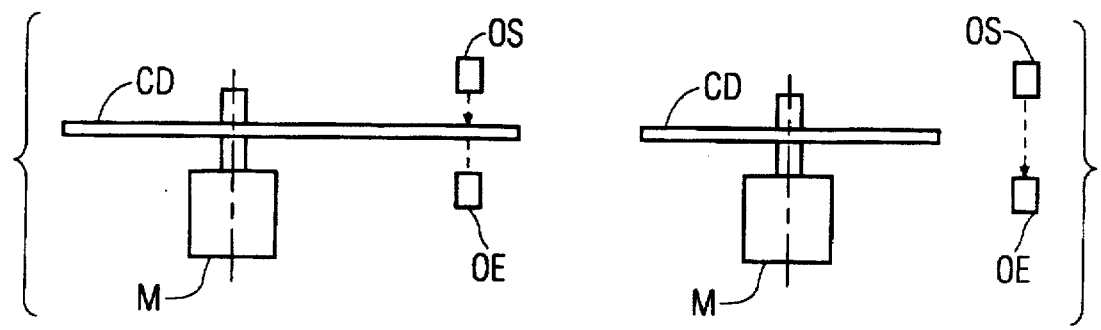
FIG. 3 shows a photo-electric detector useful with the invention.

FIG. 2 shows how the embodiment of FIG. 1 can be modified by using a second ROM R2. By use of a change-over switch US, the output of counter Z1 can be coupled to either the first ROM R1 or the second ROM R2. The outputs of the two ROM's R1 and R2 are coupled to the inputs of an OR-gate O, the output pulse of which is the braking pulse for the rotating speed regulator MR of the disc drive motor M. The bit patterns for a standard compact disc can be stored in the first ROM R1 and the bit patterns for a mini-compact disc can be stored in the second ROM R2. The switch-over between the first and second ROMs can be performed either manually or automatically. As shown in FIG. 3, the diameter of the compact disc CD can be determined by, for example, a photo-electric sensor consisting of an optical transmitter OS and an optical receiver OE.

Stopping a mini-compact disc, which has a smaller diameter than a standard compact disc, requires less braking force, assuming the same rotating speed, than is required for the larger standard compact disc because of the lower mass. Accordingly, with the embodiment shown in FIG. 4, both the rotational speed and the mass of the disc are taken into account. A braking test pulse is given to the motor M and is of such a magnitude that the compact disc CD is braked but the data reproduction is not impaired thereby. The rotating speeds prior to and after the test braking impulse are measured and compared with each other. The comparison now serves as a basis for determining the duration of the braking pulses.

Figure 4:
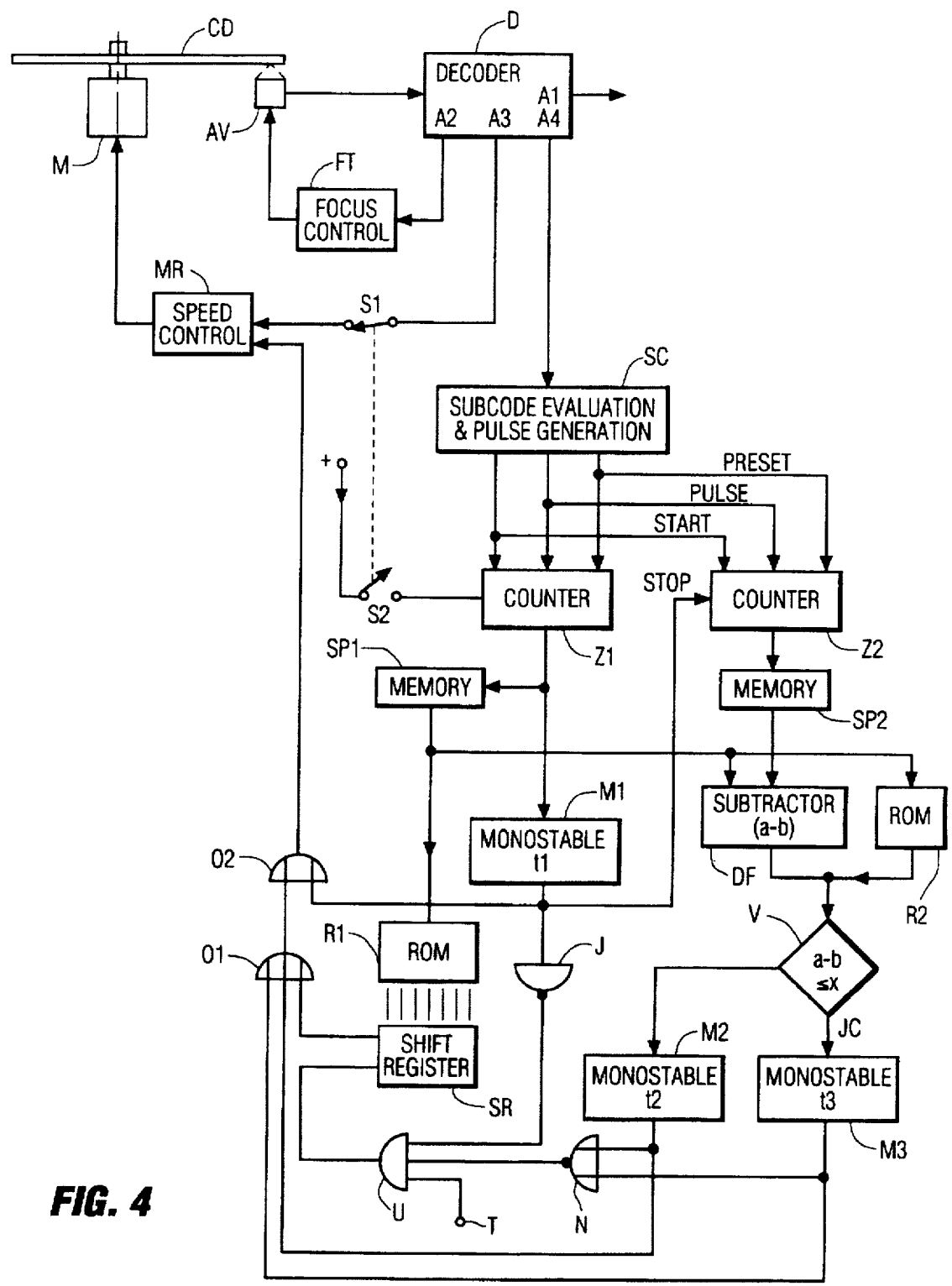
FIG. 4 is another preferred embodiment.

In FIG. 4 a compact disc CD is driven by a motor M, the rotating speed of which is regulated by a rotating speed regulator MR. An optical scanning device AV supplies data signal to decoder D, the output terminal A1 of which provides the audio signal. An output terminal A2 is coupled with a regulator FT of a focusing and tracking regulating loop. An output terminal A3 is coupled via switch S1 to a rotating speed regulator MR, and an output terminal A4 is coupled to an evaluation circuit SC. The output terminals of the evaluation circuit SC are coupled to a counter Z1 and a counter Z2. A switch S2 is used to apply a positive voltage to the stop input terminal of counter Z1. The output terminals of counter Z1 are coupled to a memory SP1 and a monoflop M1. The output terminals of counter Z2 are coupled to the input terminals of a memory SP2, the output terminal of which is coupled to a difference circuit DF. The output terminals of memory SP1 are also coupled to the difference circuit DF and to a ROM R1, the output terminals of which are coupled to a shift register SR. The output terminal of difference circuit DF is coupled to the input of a comparator V, the first output of which is coupled to a monoflop M2 and the second output terminal of which is coupled to a monoflop M3. The output terminal of the monoflop M2 is coupled to respective first input terminals of a NOR gate N and an OR gate 01. The output terminal of the monoflop M3 is coupled to respective second input terminals of the NOR gate N and the OR gate 01. A third input terminal of the OR gate 01 is coupled to the output terminal of the shift register SR. The output of the OR gate 01 and the output of the monoflop M1 are coupled to the input of the speed regulator MR via a second OR gate 02. The output of the monoflop M1 is coupled via an inverter J to one input terminal of an AND gate U. The output of the NOR gate N is coupled to a second input terminal of the AND gate U. A clock pulse T is coupled to a third input terminal of the AND gate U, the output of which is coupled to the clock input terminal of the shift register SR.

The pulse diagrams of FIG. 5, are useful in understanding the operation of the embodiment shown in FIG. 4. In the play mode, the count of the counter Z1 is constantly updated by the evaluation circuit SC so that the count is always proportional to the actual rotating speed of the disc. When the user presses the STOP button, as indicated in FIG. 5a, switch S1 is opened, and switch S2 is simultaneously closed. Counter Z1 is stopped and its count is stored in memory SP1. The rotating speed prior to the test braking pulse is, therefore, stored in memory SP1. Also, the monoflop M1 is set for the time T1 and the motor M receives a test braking pulse which lasts the duration t1, as shown in FIG. 5b. At the same time, because of the inverter 1, and the AND-gate U, the shift register SR is inhibited. After the time t1, the monoflop M1 flips back into its stable condition, counter Z2 is stopped and its count corresponds to the rotational speed reduced by the test braking pulse. The count of the counter Z2 is stored by memory SP2. The difference circuit DF takes the difference between the counts of the two counters Z1 and Z2 and compares the difference with a predetermined threshold value X, which is stored in the comparator V. The time which is required by the difference circuit DF to form the difference between the two counts, and that required by the comparator V for the comparison, is designated as tz in FIGS. 5c and 5d. When the difference is above the threshold value X, the monoflop M2 is set. When the difference is below the threshold value X the monoflop M3, the time constant t3 of which is less than the time constant t2 of monoflop M2, is set. By setting either monoflop M2 or monoflop M3 the shift register SR is released and either one braking pulse or several braking pulses are applied to motor M. After the time t2 or t3, the monoflop M2 or M3 returns to the stable default position and the shift register SR is again blocked by the AND-gate U.

Figure 5A:
FIGS. 5A–5F show pulse diagrams for the embodiment of FIG. 4.
Figure 5B:
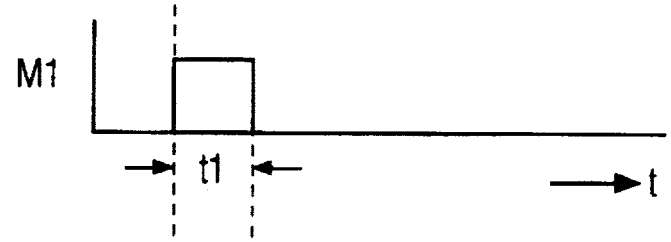
Figure 5C:
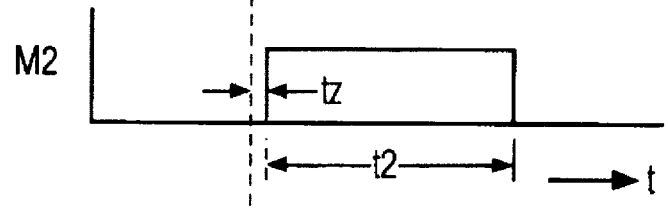
Figure 5D:
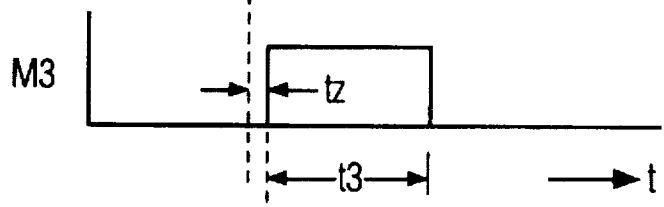
Figure 5E:
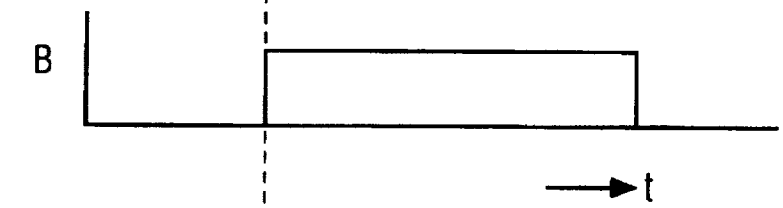
Figure 5F:
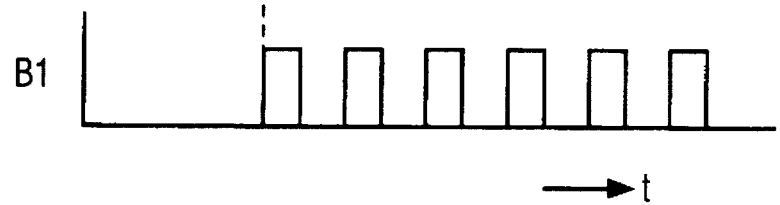

FIG. 5c shows the output signal of monoflop M2 and FIG. 5d shows that of monoflop M3. A braking pulse B, which is provided when the monoflop M3 is set is illustrated in FIG. 5e. FIG. 5f shows several braking impulses BI which are supplied by the shift register SR when monoflop M2 is set. Thus, while monoflop M2 or M3 respectively are set, either one long braking pulse or several braking pulses of a shorter duration are supplied.

Instead of one comparator V several comparators can be provided in order to provide several breaking intervals. The comparator determines the difference interval formed by the difference circuit DF. One monoflop is then provided for every interval because it is the particular monoflop in which the interval occurs that is set, differing braking impulses are generated. The second counter 22 can also be omitted. After memory SP1 has stored the count of the counter Z1 prior to the test braking pulse, counter Z1 continues to count. At the end of the test braking pulse memory SP2 assumes the new count of the counter Z1, which corresponds to the rotating speed reduced by the test braking impulse.

A third embodiment can be a combination of the embodiments of FIGS. 1 and 4. The actual count of counter Z1, which is proportional to the rotating speed of the disc, is compared to a predetermined threshold value. When the count lies below the threshold value i.e. the rotating speed is below a threshold value, the braking pulse is generated by the ROM R1 and the shift register SR, as shown in FIG. 1. However, when the count of counter Z1 is greater than, or equal to, the threshold value, i.e., the rotating speed is also greater than, or equal to, a threshold value, a test braking pulse is supplied and subsequently at least one, or more, braking pulses is provided by either monoflop M2 or M3 according to the embodiment shown in FIG. 2.

The invention is, for example, suitable for compact disc players, video disc players, CDV players, DRAW disc players or magneto-optical devices.

I claim:

1. In a CLV disc playback system of the type including a motor for rotating disc records responsive to motor drive signals and including signal pickup means for reproducing recorded information from disc records, said recorded information containing interspersed subcodes having values related to the radial position currently accessed by said pickup means with respect to the axis of the disc, apparatus for stopping the rotation of rotating discs, comprising:

detector means, coupled to said pickup means, for detecting said interspersed subcodes related to the radial position of said pickup means;

means responsive to detected subcodes for generating pulses indicative of detection of said subcodes;

a counter arranged to be preset with a value representing a predetermined subcode and responsive to said pulses for providing a count value equal to a sum of said value representing a predetermined subcode and the number of said pulses occurring after presetting said counter;

means, responsive to user stimuli for stopping rotation of said disc, for storing a current count value provided by said counter; and means responsive to said current count value for providing a predetermined reverse drive braking signal to stop rotation of said disc record; and means for applying said braking signal to said motor.

2. The apparatus set forth in claim 1 wherein said means responsive to said current count value for providing a predetermined reverse drive braking signal comprises:

memory means having an address input coupled to receive said current count value, and having an output port, said memory means being programmed at respective address locations with logic one and zero braking pulse patterns; and parallel-to-serial shift register means having a parallel input port coupled to the output port of said memory means, a clock input port responsive to clock signals, and an output port coupled to apparatus for controlling the rotational speed of said motor.

* * * * *